United States Patent [19]

Edge

[11] Patent Number: 5,191,537
[45] Date of Patent: Mar. 2, 1993

[54] SYSTEM AND METHOD FOR CONTROLLING CONTINUOUS MIXER WITH MELT PUMP

[75] Inventor: James M. Edge, Channahon, Ill.

[73] Assignee: Quantum Chemical Corporation, New York, N.Y.

[21] Appl. No.: 330,507

[22] Filed: Mar. 29, 1989

[51] Int. Cl.[5] .................. G06F 15/46; B28C 7/16
[52] U.S. Cl. ............................ 364/473; 364/148; 364/469; 364/477; 366/77; 366/132
[58] Field of Search ............... 364/148, 154, 162, 469, 364/468, 473, 477; 366/69, 70, 77, 131, 132; 408/44.5, 25, 125

[56] References Cited

U.S. PATENT DOCUMENTS 4,328,549  5/1982  Avery .................... 364/469
4,501,498  2/1985  McKelvey ............... 366/69
4,707,139  11/1987 Valenzky et al. ......... 366/77

Primary Examiner—Jerry Smith
Assistant Examiner—Paul Gordon
Attorney, Agent, or Firm—Kenneth D. Tremain; Gerald A. Baracka

[57] ABSTRACT

An improved system and method for effectively controlling the operation of a continuous mixer/melter having an adjustable exit opening and connected to a melt pump is provided. The melt pump, which is preferably a gear pump, is operatively connected to an extruder/pelletizer. Operation of the gear pump is controlled in proportional relation to the energy requirements of the mixer/melter motor, the energy applied to adjust and maintain the exit opening of the mixer/melter, and the suction pressure measured at the interface between the mixer/melter and the gear pump. A microprocessor unit which receives and processes the input signals, calculates the energy requirements of the gear pump motor and compares these requirements with the actual torque, makes the necessary adjustments to the gear pump.

5 Claims, 1 Drawing Sheet

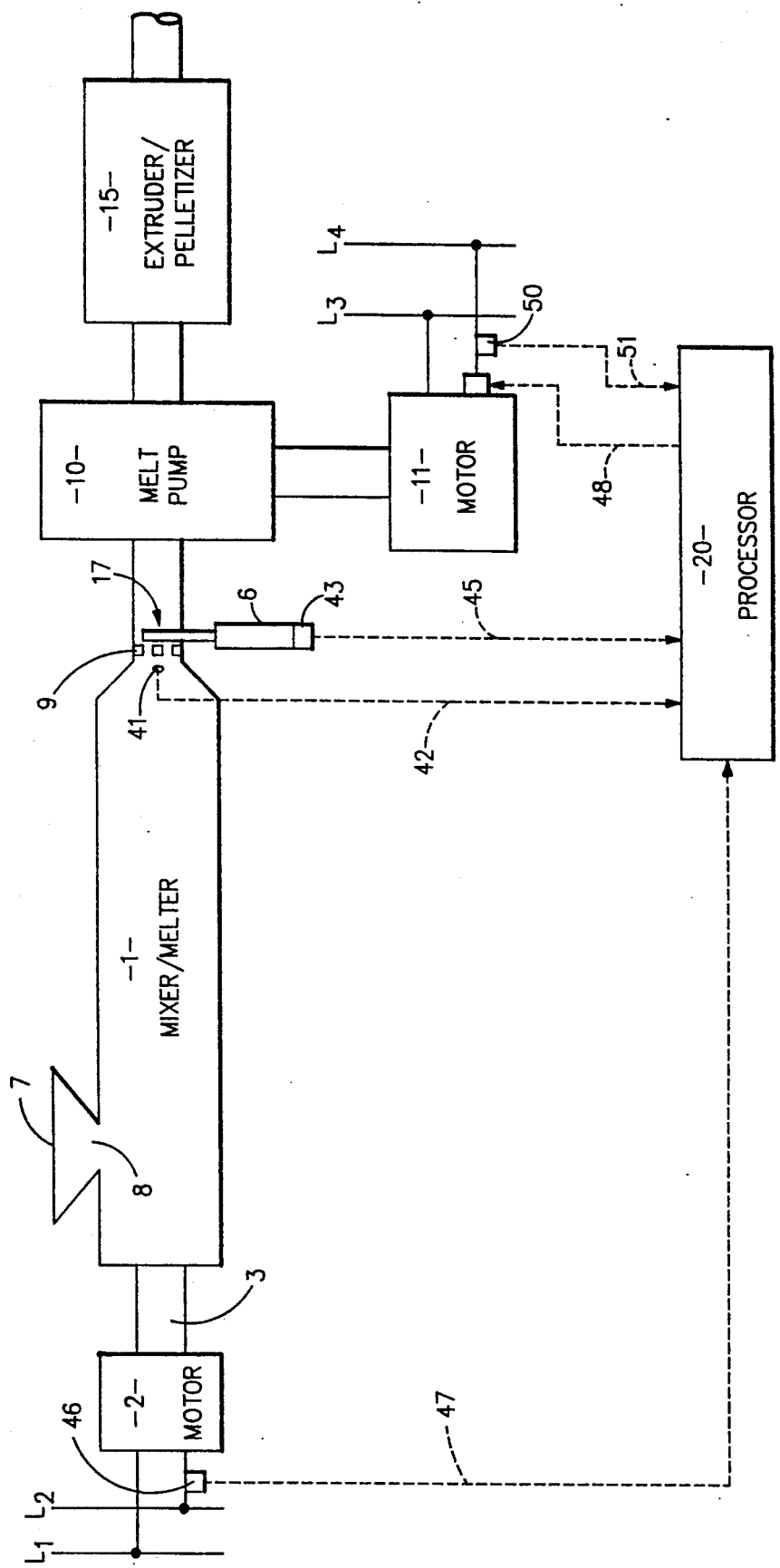

SYSTEM AND METHOD FOR CONTROLLING CONTINUOUS MIXER WITH MELT PUMP

BACKGROUND OF THE INVENTION

1 Field of the Invention

The present invention relates to a process for effectively controlling operation of a continuous mixer having an adjustable exit opening which is connected to a melt pump.

2. Description of the Prior Art

Numerous polymer resins, e.g., polyethylene and polypropylene, are produced as very fine particles and are subsequently converted to pellets to facilitate shipping and handling. At this stage of the processing, the resin can additionally be compounded with additives, such as stabilizers, antioxidants, fillers, colorants, and the like, if desired. In general terms, this in-line processing is accomplished by mixing and melting the resin after it has been purged of any unreacted monomer(s) or other volatile materials and forcing the melt through a suitable die plate into a pelletizer. The pelletizer consists of a means for chopping and cooling the extrudate.

More specifically, the resin is continuously fed into a combination mixer/melter having interspaced entrance and exit openings and a means for moving the material therethrough. Combination mixer/melters, sometimes simply referred to as mixers, are known and widely utilized for the continuous processing and compounding of thermoplastic materials. Mixer/melters have a restraining means for controlling the flow of exiting resin. This restraining means which in addition to controlling throughput, creates a back pressure within the mixer which influences the mixing/melting efficiency. Since the temperature within the mixer is directly proportional to the pressure, i.e. temperature increases as more work is performed on the resin, varying the flow rate also serves to control the temperature. Restraint to the flow of material discharged from continuous mixers is generally accomplished through the use of an adjustable exit opening and/or by using a moving surface discharge device which contacts the material with one or more surfaces moving at controlled speeds in the direction of flow. Gear pumps and extruder screws are most widely used to provide such moving surfaces.

Mixer melters are typically low energy systems and are not capable of developing the pressures necessary to achieve acceptable extrusion rates. They are therefore usually coupled with a melt pump, such as a gear pump or extruder screw, which imparts the necessary high energy to the resin melt for extrusion and pelletization. The melt pump also serves to control the pressure and throughput in the mixer as described above.

While the mixer and the melt pump are independently driven, each having their own motor drive, operation of the mixer and melt pump must be carefully matched to avoid problems in the in-line processing system. For example, if too large an amount of resin melt is fed from the mixer to the melt pump, the pump capacity will be exceeded which can create excessive back pressure in the mixer causing the rupture disk to blow. If an insufficient amount of resin is fed to the melt pump, i.e. the gear pump is operated in a starved condition, excessive speeds (rpm) can be generated in the gear pump causing the gear pins to shear. In either instance, the line will have to be shutdown until the necessary repairs can be made. Such disruptions are time-consuming and costly and, if the line is down for an extended period, necessitate shutting down the polymerizer. To minimize these problems, the mixer and melt pump are suitably sized and coupled so that feed from the mixer/melter matches the requirements of the melt pump but does not exceed that necessary to achieve effective mixing and melting of the resin being processed.

Several methods have been employed by the prior art processes in an effort to overcome the problems associated with the continuous in-line processing of plastic materials using a mixer interconnected to a gear pump. For example, U.S. Pat. No. 4,310,251 to Scharer et al discloses a continuous internal mixer which discharges through a fixed-size opening directly and positively to either a screw type extruder or a gear pump. The speed of the gear pump or extruder automatically responds to the temperature of the material discharged from the mixer which is a function of the mixer internal pressure.

U.S. Pat. No. 4,452,750 to Handwerk et al discloses an in-line mixer-gear pump arrangement for processing synthetic thermoplastic materials which employs the pressure developed between the fixed-size exit port of the mixer and gear pump to effectively control the speed of the gear pump. This in turn affects, in proportional relationship, the amount of energy transmitted to the melter/mixer and the temperature of the melt.

U.S. Pat. No. 4,707,139 to Valenzky et al relates to a control system for a continuous mixer having a moving surface discharge device. The internal pressure in the mixer and the discharge of material from the mixer is controlled by the gear pump and the speed (rpm) of the gear pump is controlled in relation to the torque produced by the mixer motor. A change in the torque of the mixer motor results in a change in the rpm of the gear pump, thereby maintaining the necessary relationship throughout the in-line processing operation.

While the above methods generally effectively eliminate the major problems associated with such in-line processing operations, they are not sufficiently responsive to prevent all sudden pressure surges which result from unevenness in the mixing action. While these latter pressure surges are relatively minor compared to the larger catastrophic pressure differentials previously mentioned and do not result in equipment failure and shutdown of the processing line, they do nevertheless adversely affect the quality of the resulting extruded pellets. Primarily, the pellets are not of uniform size and may be irregularly shaped. In some instances, the pellets may even agglomerate. While the oversized pellets and agglomerates will be retained upon screening, they must either be reprocessed or scraped. Smaller-sized pellets will pass through the screens; and, if they are present in sufficient quantity, necessitate downgrading of the resin.

It is therefore an object of this invention to provide a system and method for controlling a continuous mixer having an adjustable exit opening and connected to a moving surface discharge device to effectively control the speed of the discharge device and thereby maintain the necessary relationships throughout the in-line processing operation.

It is a further object of this invention to provide a system and method for controlling a continuous mixer having an adjustable opening and connected to a melt pump which is more responsive to changes and imbalances which develop within the in-line processing equipment.

Yet another objective of the present invention is to provide a system and method for controlling a continuous mixer having an adjustable opening controlled by hydraulic pressure and connected to a gear pump to minimize pressure surges which adversely affect the quality of the extruded pellets and to obtain pellets which are as uniformly sized as possible.

BRIEF SUMMARY OF THE INVENTION

The present invention relates to a process for effectively controlling a continuous mixer/melter having an adjustable opening and which is connected to a melt pump. The continuous mixer has interspaced entrance and exit openings and a means for moving the thermoplastic material therethrough. Resin melt is discharged from the mixer in a controlled manner through an adjustable orifice which is opened or closed to adjust the pressure and temperature within the mixer to an independently operated moving surface discharge device, which can be a gear pump or extruder screw, and which pumps the melt through an extruder die for pelletization. The rate of discharge of melt from the mixer is further controlled by adjusting the speed of the melt pump in proportional relation to the energy requirements of the mixer motor, the energy applied to the adjustable orifice of the mixer and the pressure produced at the interface between the mixer and the melt pump, referred to herein as the suction pressure. A change in any or all of these variables results in a change in the operation of the melt pump, thus compensating for changes and imbalances which occur in the system and resulting in more uniform feed to the extruder die. By eliminating or minimizing troublesome pressure surges, more uniformly sized resin pellets are produced.

BRIEF DESCRIPTION OF THE DRAWING

FIG. 1 is a schematized diagram representation of the in-line processing equipment showing arrangement of the mixer/melter and the melt pump and the relationship of the input and output signals utilized by the system and method of the present invention.

DETAILED DESCRIPTION

For the purpose of illustration, a specific control configuration is set forth in FIG. 1. Other embodiments are however, possible and the control configuration can be modified accordingly. While reference is made to specific types of equipment for the processing operation, the present control system and method can be adapted for use with processing equipment other than that specifically illustrated which accomplishes the desired function. In general, any control method and system which detects changes forward of the suction pressure and anticipates changes in the suction pressure before they occur thereby permitting early response of the melt pump to compensate for such changes is within the scope of this invention.

In general, input and output signal lines are electrical or pneumatic and can be transduced using any of a variety of transducing means known in the art. Since transducing means are known and are not a novel part of the present invention, such transducing means are not illustrated and are not described in detail herein. As employed herein, the term "signal" is used in the generic sense and encompasses electrical, mechanical or pneumatic signals or combinations thereof whether in digital or analog form, scaled or unscaled.

To monitor and control the melt pump, a microprocessor is connected to the melt pump motor in accordance with known procedures. Microprocessor controllers useful for the invention may be any of the commercially available multiple input controllers known to the art. Preferably the controller utilizes a proportional-integral or proportional-integral derivative mode of operation. Any controller, however, capable of accepting at least three input signals and producing a scaled output signal to control a motor can be used and is within the scope of the invention. Scaling of output signals by controllers is well-known and the controller may be scaled in any fashion known to effectively control the motor. Whereas in the preferred embodiment, the desired torque is compared with the actual torque by the controller and a signal generated representative of the change required to equalize the two values, the output signal could be based on rpm, flow rate or the like.

The three input signals required for the control of the present invention include: the energy required to drive the rotor of the mixer/melter; the energy applied to the exit opening of the mixer/melter to maintain the necessary back pressure and temperature within the mixer/melter; and the pressure of the thermoplastic resin melt at the interface between the adjustable exit opening of the mixer/melter and the inlet of the melt pump. A feedback signal proportional to the actual energy being used by the melt pump motor is also required. The output signal from the processor is utilized to control the speed of the melt pump. In the case of a gear pump, it would control the rpm of the pump gears.

In the preferred embodiment of this invention, in addition to monitoring the suction pressure between the mixer/melter and the melt pump, the hydraulic oil pressure of the hydraulic pump utilized to adjust the exit opening of the mixer/melter and the power consumption of the mixer/melter motor are monitored. This makes it possible to detect changes occurring within the mixer/melter at a much earlier stage and before these changes affect the suction pressure. Adjustments necessary to the downstream processing equipment and primarily the melt pump to compensate for these changes can be anticipated. Therefore, rather than having to recover after demands are made, the downstream processing equipment will already be in a mode to handle these demands when and as they occur. Specifically referring now to FIG. 1, there is illustrated an in-line processing arrangement in accordance with the present invention comprising a conventional continuous mixer/melter 1 directly and positively connected to a melt pump 10 which feeds extruder/pelletizer 15. Continuous mixer/melter 1 can be any commercially available mixer/melter. Such continuous mixer/melters are described, for example, in U.S. Pat. Nos. 3,154,808 and 3,237,241. In general, these mixer/melters include a barrel forming at least one substantially cylindrical material working chamber with interspaced entrance and exit openings 8 and 9, respectively. Most generally, such mixers contain two parallel, laterally interconnected, cylindrical working chambers having a common exit opening 9. The synthetic thermoplastic resin is introduced through entrance opening 8 where it engages a bladed rotor which extends axially within the cylindrical working chamber and pushes the material in the direction of exit opening 9. When the mixer/melter has multiple working chambers and rotors, the rotors are generally geared to rotate in opposite directions.

The rotors may be configured to create multiple sections or zones within the working chamber. For example, by varying the blade configuration successive conveying, melting, mixing and pumping zones may be provided with either single-screw or twin-screw mixer/melters. Such techniques are well-known and widely used throughout the industry particularly when the temperatures of the different zones are also varied.

The thermoplastic material to be processed is fed to the mixer/melter 1 through entrance opening 8 via feeder means 7 of the mixer. Feeder 7 can be a gravity feed or any of a variety of automatic feeders known to the art which are capable of receiving and responding to a control signal which can take different forms depending on the particular mode of operation. Since the feeder and feeder control do not play a part in the present invention and since such feeding mechanisms are known, they are not described in detail herein.

Mixer/melter 1 has a variable speed motor 2 which drives the bladed rotor within the mixing chamber. The motor 2 is directly coupled to the rotor through drive means 3, which can include a gear reducer means or the like. The motor 2 may be any type, e.g. electric or hydraulic, capable of generating adequate torque and capable of being controlled to maintain the rotor(s) at constant rpm. The motor 2 is preferably an electric motor connected to an appropriate power supply L1, L2.

Exit opening 9 is regulated by control means 6 which in addition to determining the rate of flow of the exiting resin also influences the back pressure and temperature within the mixer/melter 1. The use of adjustable exit openings on continuous mixers is known and described in, for example, U.S. Pat. Nos. 3,154,808 and 3,237,241. Restriction of the flow of the exiting resin can be accomplished using known designs such as use of a swinging door or sliding gate type of arrangements. Similarly, the exit openings may consist of multiple ports wherein one or more of the ports will be opened or closed as required to restrict the resin flow and control the mixing, as schematically shown at 17. In yet another arrangement, the continuous mixer/melter can have a movable barrel which slides in relation to the rotor thereby permitting more or less flow of the resin melt. Continuous mixer/melters of this type are known and commercially available. All of the above are typically controlled using electric or hydraulic means in response to the pressure or temperature within the mixer/melter. Means for controlling material flow from mixer/melters in response to signals representative of the flow or conditions within the mixer/melter are known. Similarly, means for controlling a mixer/melter motor in response to signals representative of the flow or pressure or temperature within the mixer/melter are known. In view of this and in view of the fact that neither of these aspects are a novel part of the present invention, such means are not more fully described herein.

Control means 6 is most generally a hydraulic control, i.e. one or more hydraulic cylinders supplied with hydraulic fluid and connected to a pressure source, connected to exit opening or discharge orifice 9 to apply opening and closing motion thereto. Since under actual working conditions the temperature of the thermoplastic material varies quickly in relation to the amount of work being applied and since these variations can be quickly and readily monitored, temperature is preferably used to control the size of the exit opening 9 and the amount of energy supplied to the motor 2.

While the signal for controlling the exit opening 9 and the mixer/melter motor 2 can be generated using separate controller means, it can also be accomplished with a single controller. In a preferred mode of operation, the multiple input microprocessor 20 utilized to generate the signal for control of the gear pump motor 11 is also employed to generate the signals which control mixer/melter motor 2 and hydraulic control means 6 which in turn varies the size of exit opening 9.

A melt pump having one or more moving surfaces which engage the thermoplastic material is directly and positively connected to mixer/melter 1 after exit opening 9. A direct and positive connection is made to minimize the distance between the outlet of the mixer/melter and gear pump inlet and to insure that the communication is a hydraulically (resin melt) filled and pressurized communication. Melt pumps with one or more moving surfaces which contact the resin melt in the direction of the flow of the material at a variable and controllable rate are known for processing thermoplastic materials and are described, for example, in U.S. Pat. No. 4,707,139. The melt pump 10 is preferably a gear pump with inlet directly and positively connected to exit opening 9 and outlet connected to extruder/pelletizer 15.

Melt pump 10 has a variable speed motor 11 which drives the counter-rotating intermeshing pump gears. The motor 11 is directly coupled to the pump gears through drive means 12 which can include a gear reducer means or the like. The motor 11 may be any type, e.g. electric or hydraulic, capable of generating adequate torque and capable of being controlled to adjust the gear rpm. The motor 11 is preferably an electric motor connected to an appropriate power supply L3, L4.

The molten resin exiting the outlet of gear pump 10 is passed through an extruder die plate where the material is pelletized. An extruder die and pelletizing means are shown collectively at 15. Pelletizing means are well known to the art and generally consist of an extruder plate which discharges the extrudate underwater past a chopping means, generally consisting of rotating knives or blades. The pellets are cooled and transported by the water to separator screens to collect the pellets. The pellets are then conveyed to a centrifugal dryer where they are dried and screened to eliminate oversized or agglomerated particles and collected for storage and transportation.

For the sake of description hereafter, motors 2 and 11 are assumed to be electric motors; melt pump 10 is assumed to be a gear pump; and control means 6 is assumed to be a hydraulic control operatively connected to exit opening 9 by conventional means known to the art.

In accordance with the present invention there is provided a means for more effectively controlling gear pump 10 to eliminate or minimize changes in the pressure differential across the pump thereby producing more uniformly sized resin pellets in extruder/pelletizer 15. This is accomplished by providing a microprocessor control 20 capable of receiving and processing a first input signal indicative of the energy required to rotate the rotor(s) of the mixer/melter 1, a second input signal indicative of the energy required to vary the size of exit opening 9 and a third input signal indicative of the pressure developed at the interface between exit opening 9 and the inlet of gear pump 10, and generating an output signal to control gear pump motor 11. A feedback signal from gear pump motor 11 indicative of the actual energy used by motor 11 is also provided to said microprocessor means 20.

The suction pressure, i.e. the pressure developed at the interface between exit opening 9 and the inlet of gear pump 10 will be monitored using a pressure detector 41. The signal from the pressure-responsive means 41, after transducing from the pneumatic to electric mode, via line 42, is provided as one of the variable inputs to microprocessor 20. The second or the grovementioned signals is similarly generated from a pressure sensor 43 and is indicative of the energy required to vary the size of exit opening 39; and this signal from sensor 43, after transducing, is provided as another variable input, via line 44, to the microprocessor 20. Since the torque developed by motor 2 is proportioned to the amperage drawn, the first of above-mentioned signals representative of the amperage supplied to motor 2 and is the final variable input provided to microprocessor 20. This signal is generated by sensing means 46, and transmitted to processor 20 via line 47. It will of course be understood that alternative forms of these signals can be used as inputs to microprocessor controller 20 to generate the control signal.

In response to the above-defined input signals, microprocessor 20 provides, via line 48, a control signal to motor 11 used to drive gear pump 10 which is representative of the amperage required to maintain the rpm of the gear pump 10. A signal which is representative of the actual amperage drawn by motor 11, and thus is indicative of the torque developed by motor 11, in the operation of gear pump 10 is sensed by means 50 and fed back to microprocessor 20, via line 51 and compared with the target or required value and adjustments made accordingly.

As a result of the process measurements which are used to control operation of gear pump 10, it has been found that the pump speed (rpm) can be more effectively controlled to, in part, control the energy input to the thermoplastic material in mixer/melter 1 and further to compensate for changes and imbalances which occur in the processing equipment forward of the gear pump 10 (primarily in mixer/melter 1 due to unevenness of mixing action). By detecting changes which occur in the processing equipment before the suction pressure and by inputting these signals, controller 20 can make adjustments to gear pump 10 to compensate therefore before they are reflected by a change in the suction pressure. This permits earlier adjustment of the gear pump 10 so that it, in effect, anticipates the demands which will be made on it. This has a leveling effect on the overall operation of the process as it compensates for the generally slow response characteristics of motor 11 and gear pump 10.

The thermoplastic resin melt at the outlet of the mixer/melter is, independently, held constant within ±10° C. This temperature will of course vary depending on the particular synthetic thermoplastic material being processed. In general, the temperature is dependent on the amount of energy applied to the thermoplastic mass and the residence time of mass in the working chamber. The temperature is therefore controlled by the amount of energy applied to the rotor by motor 2 and the amount of the resin exiting mixer/melter 1 through adjustable exit opening 9. Motor 2 and exit opening 9 can be controlled by an independent controller or by controller 20 if it has sufficient processing capabilities and can accept the additional inputs necessary to perform the function and generate additional output signals. The input to the controller is generated from a temperature sensor on the mixer/melter 1 located near but before exit opening 9. Output signals from the controller to motor 2 and hydraulic control means 6 which adjusts exit opening 9 will depend on the difference between the actual temperature of the thermoplastic resin at the outlet of mixer/melter 1 and the desired or set point temperature.

I claim:

1. In the continuous in-line operation of a mixer/melter having an adjustable size exit opening for feeding a thermoplastic resin melt directly and positively to a melt pump which pumps the melt through an extruder/pelletizer for pelletization, to reduce pressure surges and obtain more uniformly sized pellets, the improvement which comprises:
    generating a first input signal representing the amount of energy used by the mixer/melter to feed the thermoplastic resin therethrough;
    generating a second input signal representing the amount of energy used to adjust the size of the adjustable exit opening;
    generating a third input signal representing the pressure of the resin melt at the interface between the mixer/melter and the melt pump;
    transmitting the first, second, and third input signals to a processor;
    the processor processing the first, second, and third input signals to determine a desired energy level for the melt pump; and
    the processor generating an output signal and transmitting the output signal to the melt pump to adjust the energy used by the melt pump to said desired level.

2. In the continuous in-line operation of claim 1, wherein the melt pump includes a pump motor to operate the melt pump, and the transmitting step includes the step of transmitting the output signal to the pump motor to adjust the energy used by the pump motor to said desired level.

3. In the continuous in-line operation of claim 2, further including the step of:
    generating a feedback signal representing an actual torque produced by the pump motor; and
    transmitting the feedback signal to the processor;
    wherein the processing step includes the step of processing the first, second, and third input signals to determine a desired torque for the pump motor;
    wherein the step of generating and transmitting the output signal includes the steps of
        i) the processor comparing said actual torque to the desired torque,
        ii) producing an output signal representing a difference between said actual and desired torques, and
        iii) transmitting the output signal to the pump motor to adjust the torque produced thereby.

4. In the continuous in-line operation of claim 3, wherein the pump motor is am electric motor, and wherein:
    the step of generating the feedback signal includes the step of generating a feedback signal representing the actual amperage drawn by the pump motor;
    the step of processing the first, second, and third input signals to determine a desired torque includes the step of processing the first, second, and third input signals to determine a desired amperage for the pump motor;

the comparing step includes the step of comparing the actual amperage to the desired amperage;

the producing step includes the step of producing a control signal representing a difference between the actual and desired amperages; and the step of transmitting the output signal to the pump motor includes the step of transmitting the control signal to the pump motor.

5. In the continuous in-line operation of claim 4, further including the step of, the pump motor adjusting the amperage drawn thereby in response to receiving the control signal.

* * * * *